United States Patent [19]

Peterpaul

[11] 4,380,256

[45] Apr. 19, 1983

[54] CABLE SLITTING AND SPREADING TOOL

[75] Inventor: Joseph Peterpaul, West Orange, N.J.

[73] Assignee: Thomas & Betts Corporation, Raritan, N.J.

[21] Appl. No.: 221,392

[22] Filed: Dec. 30, 1980

[51] Int. Cl.³ .............................................. B21F 1/00
[52] U.S. Cl. ..................................... 140/106; 30/90.8; 83/102.1
[58] Field of Search ...................... 30/90.8, 90.4, 90.3, 30/90.9, 91.1; 83/102.1; 72/325; 140/106, 105

[56] References Cited

U.S. PATENT DOCUMENTS

| | | |
|---|---|---|
| 28,068 | 5/1860 | Edwards et al. |
| 80,531 | 8/1868 | Bennet et al. |
| 1,686,044 | 10/1928 | Stott |
| 2,231,593 | 2/1941 | Pritchard ............................ 30/102 |
| 3,008,676 | 11/1961 | Scherfel ......................... 140/105 X |
| 3,279,058 | 10/1966 | Dibble ................................. 30/90.8 |
| 3,312,135 | 4/1967 | Mraz ..................................... 83/675 |
| 3,453,917 | 7/1969 | Perry .................................... 83/454 |
| 3,846,894 | 11/1974 | Parsons et al. ....................... 29/203 |
| 4,025,998 | 5/1977 | Eppler ................................ 29/566.4 |
| 4,043,238 | 8/1977 | van Ham ............................... 83/595 |
| 4,265,016 | 5/1981 | Ducret ................................ 30/90.8 |

Primary Examiner—Frank T. Yost
Attorney, Agent, or Firm—Robert M. Rodrick; Salvatore J. Abbruzzese; Jesse Woldman

[57] ABSTRACT

A palm held tool for slitting the insulating sheath of a sheathed three-conductor electrical cable and spreading the outer conductors laterally away from the central conductor is provided. The tool comprises a housing and a pair of spaced rotary cutters, each cutter including a piercing point, a slicing edge and a curved wedge thereon. Upon rotation of the cutters, the piercing point on each cutter pierces the cable at a point in the cable and each slicing edge progressively slices the cable longitudinally unidirectionally from such pierced point between a respective outer conductor and central conductor. The curved wedge subsequently enters the slit cable progressively longitudinally unidirectionally and laterally spreads the outer conductors therealong. During a complete revolution of the cutters, the piercing points, slicing edges and curved wedges sequentially enter, pass through and exit the cable.

20 Claims, 7 Drawing Figures

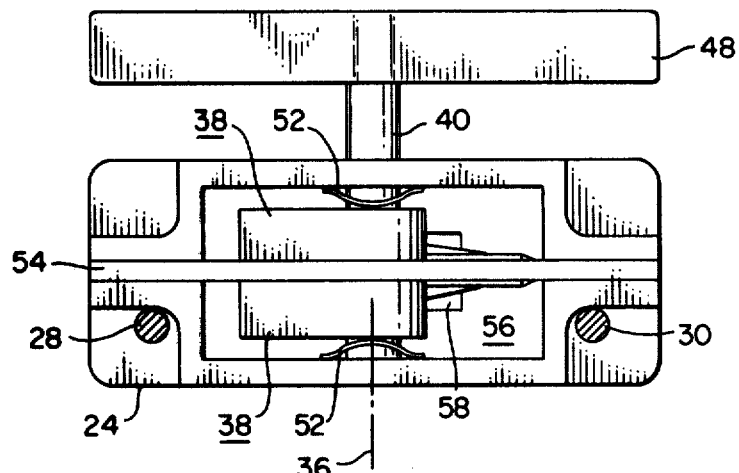
FIG. 4
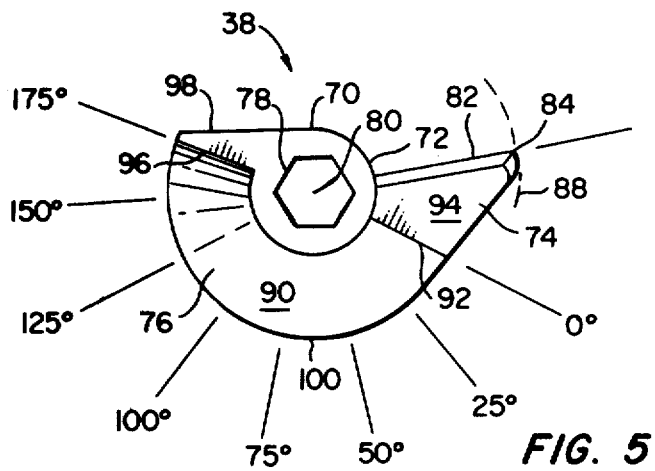
FIG. 5
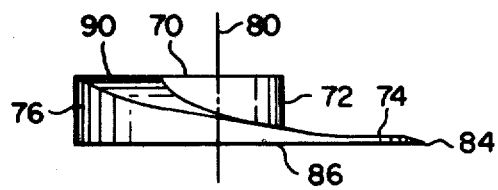
FIG. 6
| ANGLE (DEG.) | RISE (IN.) |
|---|---|
| 0 | .000 |
| 25 | .045 |
| 50 | .090 |
| 75 | .135 |
| 100 | .180 |
| 125 | .225 |
| 150 | .270 |
| 175 | .315 |
FIG. 7

CABLE SLITTING AND SPREADING TOOL

FIELD OF THE INVENTION

This invention is related to a tool for slitting an insulating jacket surrounding an electrical conductor in an electrical cable and more particularly to such a tool for slitting the outer sheath of a three-conductor sheathed cable and laterally spreading apart the outer conductors.

BACKGROUND OF THE INVENTION

There is now in extensive use a three-conductor electrical cable that includes a pair of insulating wires for conducting alternating current and a centrally disposed non-insulated ground wire, all being encapsulated by an insulating sheath. The outer insulating sheath in which the three wires are disposed in parallel relation in a common plane generally presents a substantially oval shape in cross-section, being substantially flat on the elongate sides thereof.

Electrical receptacles for employing such a three-conductor cable without severing the conductors are known in the art, such a receptacle being shown and described in U.S. Pat. No. 3,966,152 issued to Menasche Bromberg on June 29, 1976 and assigned to the same assignee as the present invention. Preparation of cable for use in such a receptacle is achieved by making a pair of elongate slits through the outer insulating sheath on each side of the ground wire and generally between the ground wire and each adjacent insulated conductive wire. The slitting is done carefully so that the insulation on the outside conductive wires is not damaged. Prior to installation of the slit cable into the receptacle, the insulated outer conductive wires are bowed or spread outwardly from the central ground wire for being received by the receptacle that contains insulation piercing contact elements arranged to penetrate the insulation and engage the conductive portion of the wires.

There are several known tools available for preparing the electrical cable for use in electrical receptacles as described herein by slitting and spreading such cable. One such tool is disclosed in U.S. Pat. No. 4,025,998 issued to Eppler on May 31, 1977 and assigned to the same assignee as is the present invention. The tool comprises a slitting assembly vertically slidably coupled to a cradling means and including a fixed upper jaw housing the slitting assembly and a movable lower jaw supporting the cradling means. The lower jaw is arranged to be linearly driven toward the upper jaw upon closure of pivotally coupled elongate handle members.

Another tool is shown in U.S. Pat. No. 3,846,894 issued to Parsons et al. on Nov. 17, 1974. This tool utilizes a pair of exposed slicing blades which are affixed to a blade support integrally formed on one of two elongate actuating arms. The blades are directly pivotally moved to a slicing and spreading position upon manually bringing the actuating arms toward each other.

In both these devices the principle of operation for the desired slitting and spreading effects is a steep wedging action. In achieving these effects, in particular the spreading action, there is a considerable amount of surface contact and hence a relatively high force is required to accomplish the slicing and spreading operation. The long handles are used for their mechanical advantage in generating the necessary operating forces. Such long handles disadvantageously limit the use of these tools to readily accessible areas. Also, with this method of blade engagement and force application, once the cable is slit and spread, it remains on the blades and must be forcibly removed therefrom. This removal not only increases the cost of the operation but also, in the absence of suitable instructions, increases the potential for injury where the removal is effected by hand.

SUMMARY OF THE INVENTION

It is an object of the present invention to provide an improved tool for slitting and spreading the insulating sheath of an electrical cable.

It is another object of the present invention to provide an improved tool for slitting the insulating sheath of an elongate sheathed three-conductor cable and spreading the two outer conductors laterally away from the central conductor.

In accordance with the present invention, a tool for slitting and spreading an insulating jacket surrounding an electrical conductor in an elongate electrical cable comprises support means for supporting a longitudinal extent of such cable in a fixed plane thereon. Movable cutting means is provided adjacent the support means for piercing at a point the insulating jacket of an electrical cable disposed on the support means upon movement of the cutting means toward such cable and for progressively slicing upon continued movement the insulating jacket longitudinally unidirectionally from such point. Included is means for progressively longitudinally unidirectionally entering the sliced insulating jacket and laterally spreading portions thereof.

In accordance with a preferred embodiment, the tool is adapted for slitting and spreading the insulating sheath of an elongate sheathed three-conductor cable having two outer conductors and a central conductor. Such a tool comprises a housing and cable support means on the housing for supporting a longitudinal extent of the cable in a fixed plane in a longitudinal direction. A pair of spaced rotary cutting members are mounted on the housing for rotation about an axis transverse the longitudinal direction, each cutting member including a piercing point for piercing the cable positioned on the cable support means on opposite sides of the central conductor upon rotation of the cutting members. Each of the cutting members has a slicing edge extending radially therealong to the piercing point, each slicing edge lying in substantially parallel longitudinally extending planes for progressively slicing the sheath longitudinally upon continued rotation of the cutting members. A curved wedge is provided on each of the cutting members, each curved wedge extending arcuately about the axis of rotation. Each curved wedge has an inclined surface gradually extending outwardly away from the respective planes of the slicing edges for progressively longitudinally entering the sliced sheath and spreading the outer conductors laterally away from the center conductor upon rotation of the cutting members.

In accordance with another aspect of the present invention, a cutter is provided for use in a tool for slitting and spreading a sheathed multiconductor cable. The cutter comprises a rotary cutting member having an axis about which the member is rotatable, a piercing point on the member and a slicing edge extending outwardly of the axis to the piercing point. The slicing edge lies in a plane substantially orthogonal to the axis of rotation. On the member there is included an inclined cam surface lying arcuately about the axis, the inclined cam surface having a gradual rise therealong relative to the plane.

BRIEF DESCRIPTION OF THE DRAWING

FIG. 4 is a sectional view of FIG. 2 as seen along viewing lines A—A of FIG. 2.

FIG. 5 is a plan view of a rotary cutter utilized in the cable slitting and spreading tool of the present invention.

FIG. 6 is a front elevational view of the rotary cutter of FIG. 5.

FIG. 7 is a table showing the gradual rise in an inclined cam surface on the rotary cutter of FIG. 5 at various angular locations therearound.

DETAILED DESCRIPTION OF THE PREFERRED EMBODIMENTS

Figure 1:
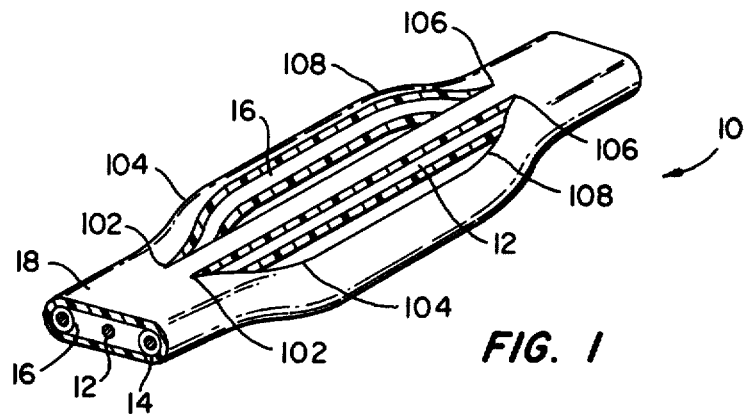
FIG. 1 is a fragmentary perspective view, partly in section, of a sheathed three-conductor electrical cable as slit and spread by the tool of the present invention.

Referring to the drawing, there is shown in FIG. 1 a conventional sheathed multiconductor cable 10 prepared for use in electrical receptacles of the type described in U.S. Pat. No. 3,966,152 as mentioned hereinabove. The cable 10 has a central conductor 12 and a pair of outer insulated conductors 14 and 16. A sheath 18 of insulating material encapsulates the three conductors providing an insulating jacket thereabout. The cable 10 is slit as shown by the tool of the present invention as will be described with the outer insulated conductors 14 and 16 spread laterally away from the central conductor 12.

Figure 2:
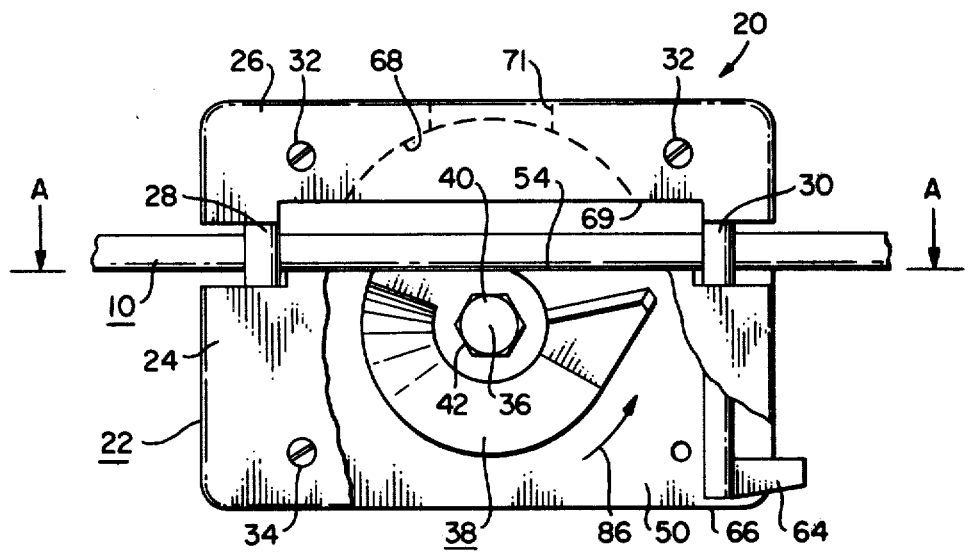
FIG. 2 is a front elevational view of a tool according to the present invention, partly broken away to show internal features thereof.
Figure 3:
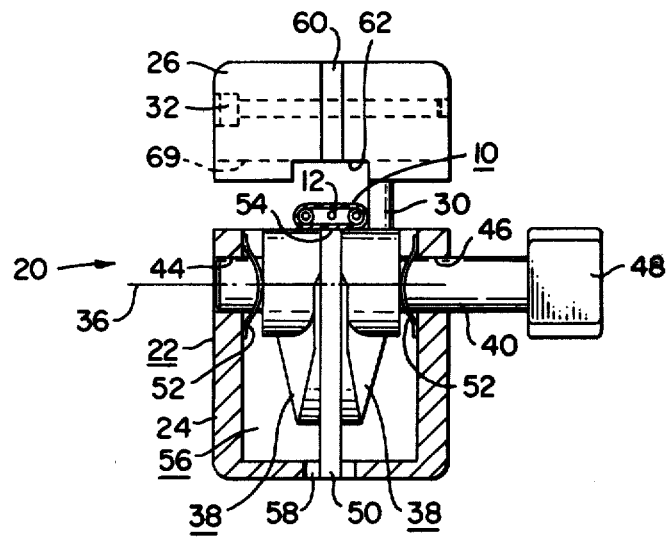
FIG. 3 is a side elevational view of the tool of FIG. 2, partly broken away.

In accordance with the invention, a tool for preparing the cable 10 in the configuration shown in FIG. 1 is shown in FIGS. 2, 3 and 4, such tool being generally designated by numeral 20. In the preferred form, the tool 20 is formed of a size capable of being held in the palm of an operator's hand. The tool 20 comprises a housing 22 having a lower portion 24 and an upper portion 26, the upper and lower portions 24 and 26 being coupled together for relative movement toward and away from each other by a pair of spaced guide rods 28 and 30. For ease of manufacture, the upper housing portion 26 may be made in two parts and held together by a set of screws 32. The lower housing portion 24 may be similarly constructed and assembled by screws 34.

Within the lower housing portion 24, there is mounted for rotation about an axis 36, a pair of metallic rotary cutters 38. The cutters 38 are mounted for tandem rotation about a shaft 40 that is provided with a hexagonal shape key 42 that mates with a similarly shaped opening in each cutter 38 to assure positive movement of the cutters 38 with rotation of the shaft 40. The lower housing portion 24 has suitable openings as at 44 and 46 for supporting the shaft 40 for rotation therein. One end of the shaft 40 is arranged to project outwardly from the lower housing portion 24 and to be suitably connected to a turn key 48 or other suitable device for rotating the shaft 40 and hence the rotary cutters 38.

An anvil 50 comprising a substantially planar, relatively narrow plate member is included between the rotary cutters 38, extending lengthwise in the same direction as a cable 10 placed within the tool 20 as shown in FIG. 1. The rotary cutters 38 are preferably biased into engagement with the anvil 50 on opposite surfaces thereof by a pair of spring members 52 which may be bowed, spring washers. Thus, the axial spacing between rotary cutters 38 is defined by the thickness of the anvil 50. The thickness of the anvil 50 is determined by the cable 10, such that the anvil thickness is greater than the thickness of the central conductor 12 but less than the closest spacing between the outer conductors 14 and 16. As shown in FIGS. 1 and 2, the anvil 50 has an upper edge 54 being substantially flat across its length, or a portion thereof, for supporting a longitudinal extent of the cable 10 thereon in a fixed plane in the tool 20. The guide rods 28 and 30 are spaced on one side of the anvil 50 to suitably contact one marginal edge of the cable 10 positioned on the anvil 50 and align the cable longitudinally parallel with the anvil edge 54. The rods 28 and 30 are arranged such that when the marginal edge of a cable 10 contacts the rods, the central conductor 12 is aligned with and supported by the anvil edge 54. The interior 56 of the lower housing portion 24 is cut away to accommodate rotation of the rotary cutters therein. An aperture 58 may be provided through the base of the lower housing 24 so as to permit escape of any debris that may collect within the interior 56 during slitting of the cable 10.

As shown in FIG. 3, an anvil 60 comprising a substantially planar member of approximately the same thickness as anvil 50 is supported by the upper housing portion 26, extending lengthwise therealong. The anvil 60 is arranged to lie in a common plane with the anvil 50 such that the opposing surfaces of the respective anvils 50 and 60 are in substantial alignment. A longitudinally extending recess 62 is provided in the upper housing portion 26 in registry with the anvil 60. The width of the recess 62 is formed to accommodate the width of the cable 10 and the depth of the recess 12 is preferably formed to be somewhat less than the thickness of the cable 10. In the preferred embodiment, the rods 28 and 30 are secured to the upper housing portion 26, the lower housing portion 24 being slidable on the rods 28 and 30. By sliding the lower and upper portions 24 and 26 toward each other, a cable 10 positioned on the lower anvil 50 against the rods 28 and 30 will be nearly encapsulated in the recess 62. As the depth of the recess 62 is less than the cable 10 thickness, the lower and upper housing portions 24 and 26 will not come into engagement but will squeeze the cable 10 therebetween in a position ready to be prepared. In the preferred form of the tool 20, the cable 10 may be held in such a position by providing a rotatable latch 64 as shown in FIG. 1. Upon closure of the lower and upper housing portions 24 and 26, the rod 30 and latch 64 are arranged to project outwardly from the bottom of the lower housing portion 24. The latch 64 may be swung transversely to engage a bottom surface 66 of the lower housing portion to hold the rod 30 and thereby the upper housing portion 26 fixed relative to the lower housing portion 24. Similar to the lower housing portion 24, the upper housing portion 26 has a cut-away portion 68 so as to provide clearance for the rotary cutters 38 as they are rotated in the tool 20. The upper portion 26 is cut away laterally across its central section to a recessed surface 69 at least to the depth of the recess 62 and at a length sufficient to span the rotary cutters 38 to provide clearance for lateral spreading of the cable 10 as will be described. A debris escape opening 71 may also be provided through the top of the upper housing 26.

The details of one of the rotary cutters 38 are shown in FIGS. 5 and 6. The cutter 38 comprises a segmented generally circular member 70, preferably having a generally semi-circular shape. The cutting member 70 includes a hub portion 72, a blade portion 74 and a curved wedge 76. An opening 78, preferably in the shape of a hexagon, is formed through the hub 72 about an axis 80 of rotation for mating with the hexagonal key 42 on the shaft 40 as shown in FIGS. 1 and 2. Preferably radially extending from the hub 72 along the blade portion 74 to its periphery is a sharp slicing edge 82. Terminating the slicing edge 82 at the blade portion periphery is a cable piercing point 84. As rotated in the direction of the arrow 86 (FIG. 2), the slicing edge 82 defines a leading edge of movement. Although the slicing edge 82 preferably extends radially from the hub 72, other blade and slicing edge configurations may be used as long as the slicing edge 82 extends outwardly of the axis 80 and the piercing point 84 initially makes contact with the cable 10 positioned on the anvil edge 54. The slicing edge 82, including the piercing point 84, lies in a substantially flat plane 86 on the cutting member 70 that is substantially orthogonal to the axis 80. The piercing point 84 lies in a point that defines a piercing circumference 88 upon rotation of the cutting member 70 about the axis 80.

The curved wedge 76 is formed on the cutting member 70 to lie arcuately about the axis 80. The wedge 76 has an inclined cam surface 90 that is formed to gradually rise therealong relative to the plane 86. Preferably the incline in the cam surface begins at a point 92 proximate the slicing edge 82 but angularly spaced therefrom so that there is a planar region 94 on the cutting member 70 between the slicing edge 82 and the beginning 92 of the inclined surface 90. The inclined surface 90 of the curved wedge 76 terminates at a location 96 that is adjacent an edge 98 of the cutting member 70 that defines a trailing edge of the cutting member 70 upon rotation thereof. The terminating location 96 may be formed to merge with the trailing edge 98. The curved wedge 76 may be formed to have the gradual rise in the inclined surface 90 from the beginning point 92 to the terminating location 96 in accordance with the table shown in FIG. 7 with reference to the angular positions shown in FIG. 5. In such a configuration the angular spacing between the slicing edge 82 and the beginning point 92 of the inclined surface 90 may be about forty degrees. It should be understood that other rise/angle relationships may be utilized in the practice of the invention depending upon desired cutting and spreading parameters.

The curved wedge 76 is formed to have an outer peripheral portion that defines a wedging circumference 100. In the preferred embodiment, the piercing circumference 88 is formed to be greater than the wedging circumference 100, the purpose of which will be described subsequently.

Referring back to FIGS. 2, 3 and 4, the cutters 38 are assembled in the tool 20 so that the cutter planes 86 and thereby the slicing edges 82 are adjacent opposite sides of the anvil 50 and in parallel planes extending longitudinally with the longitudinal extent of the cable 10, the inclining surfaces 90 extending gradually away from the longitudinal planes in the axial direction. The axis 36 of rotation of the cutters 38 is substantially transverse the longitudinal direction of the cable 10. The spring washers 52 bias the cutters toward each other such that the cutting planes 86 and thereby the cutting edges 82 are in engagement with opposite surfaces of the anvil 50. Thus, with a cable 10 properly aligned on the anvil edge 54, each of the slicing edges 82 lie respectively between an outer conductor 14, 16 and the central conductor 12 of the cable 10. The cutters 38 are mounted relative to the edge 54 and the plane defined thereby such that in an inoperative position the slicing edges 82, piercing points 84 and curved wedges 76 are below the plane of edge 54 as depicted in FIGS. 1 and 2. A detent (not shown) may be provided to releasably hold the cutters in such an inoperative position.

The axis 36 about which the cutters 38 rotate in the tool 20 is spaced below the plane of edge 54 such that upon rotation of the cutters, the piercing points 84, slicing edges 82 and the curved wedges 76 intersect sequentially the plane of edge 54 and thereby a cable 10 positioned and supportably held on the edge 54. During one complete revolution of the cutters 38, the piercing points 84, slicing edges 82 and curved wedges 76 enter, pass through and then exit the plane of edge 54, back to its inoperative positions. During rotation, the slicing edge 82 cooperates with the respective surfaces of both the lower anvil 50 and upper anvil 60 to provide a scissor-type action therebetween for slicing the cable 10.

In operation, a longitudinal extent of the cable 10 is inserted into the tool between the lower and upper housing portions 24 and 26 until one of the marginal edges of such cable 10 abuts the guide posts 28 and 30. The housing portions 24 and 26 are brought together to properly align and hold the cable on the anvil edge 54 and within the recess 62. Latch 64 may be actuated to hold the housing portions 24 and 26 in the clamping position on the cable 10. In this condition the rotary cutters 38 are in the inoperative condition. The turn key 48 is manually driven to rotatively operate the rotary cutters 38. Initially upon operation, the piercing point 84 of each cutter 38 intersects the plane of edge 54 and pierces the cable 10 at a first point 102, as shown in FIG. 1. Upon continued rotation of the turn key 48, the slicing edge 82 of each cutter slices the insulating sheath 18 progressively in a longitudinal direction unidirectionally from the pierced point 102, each slice being effected between the central conductor 12 and a respective outer conductor 14 and 16.

As rotation of the cutters 38 continues, only slicing action is effected as the planar portions 94 of the cutter 38 penetrates the cable until the beginning 92 of the inclined surface 90 of the curved wedge 76 enters the slits in the cable 10 produced by the slicing edges 82. As the wedging circumference 100 is less than the piercing circumference 88, the curved wedge 76 enters the cable 10 at a point 104 longitudinally spaced from the pierced point 102. Such a spacing is preferred as undesirable tearing of the cable 10 at the ends of the slits is minimized and more precise control of the slitting dimensions is achieved. As the cutters 38 are further rotated, the curved wedge 76 enters the cable at point 104 longitudinally progressively and laterally spreads the slit sheath 18 portions and the outer conductors 14 and 16 away from the central conductor 12 as the inclined cam surface increasingly passes through the cable 10.

With continued rotation of the cutters 38, the slicing edges 82 continue to progressively longitudinally slice the cable to a point 106. The spreading action lags the slicing action during rotation as the beginning point 92 of the curved wedge 76 is preferably angularly spaced from the leading slicing edge 82. Such construction is preferable so as to provide an independency between the cutting and spreading actions. The curved wedge 76 may be provided, however, such that the beginning point 92 of the inclined surface 90 lies closely adjacent the slicing edges 82 whereby the spreading action would be nearly simultaneous instead of lagging the slicing action. As the cable is being sliced, the lateral spreading of the sheath 18 and the outer conductors 14 and 16 will continue progressively longitudinally by the curved wedge 76 to a point 108 subsequent to point 106 having been reached by the slicing edge 82 due to the lagging effect. Point 108 to which the cable is spread is longitudinally spaced from point 106 as the wedging circumference 100 on the cutter 38 is less than the piercing circumference 88. Thus, the longitudinal distance the cable 10 is sliced, i.e., from points 102 to points 106 is greater than the longitudinal distance that the cable 10 is lateral spread, i.e., from points 104 to points 108.

Upon completion of a revolution of the turn key 48, the piercing point 84, slicing edge 82 and curved wedge 76 of each rotary cutter 38 exits the cable having effected the desired cutting and spreading operations. The slit and spread portions of the cable lie laterally along the recessed surface 69 of the upper housing portion 26 the unaffected cable portions on each longitudinal side thereof being held within the recess 62. The prepared cable 10 is readily removed from the tool by swinging the latch 64 back to its original position such that the lower and upper housing portions 24 and 26 may be slid away from each other. Upon opening of the housing portions 24 and 26 the cable 10 may be withdrawn. The cable 10 maintains its prepared form as the spread outer conductors 14 and 16 are sufficiently rigid to hold their shape.

As described herein, the tool 20 of the present invention provides several advantages over other known tools. The tool 20 is compact and useful in difficult to reach areas because of its size. The rotary cutter, cam surface feature involves a minimum amount of surface contact during the slitting operation and the outer conductor spreading is gradual due to the longer circumferential path of cam surface rise. Accordingly, lower slitting and spreading forces are needed which increase the useful life of the tool.

While the preferred embodiments of the tool 20 have been described herein, it should be appreciated that other variations may be made within the contemplated scope of the invention. For example, the housing portions may be coupled to each other by a hinge or linkage system or made to swivel relative to each other. The rotary cutter shaft may be coupled to a crank handle or to a motor drive means. The housing portions may be modified to have adjustable support means capable of accepting a range of cable widths and thickness. Also, while the point at which the cable is pierced by the rotary cutter may be construed as a precisely indicated substantially dimensionless location, it should be appreciated that such a point may also be construed to have a nominal dimensional extent within the contemplated scope of the invention.

Various other changes to the foregoing, specifically disclosed embodiments and practices will be evident to those skilled in the art. Accordingly, the foregoing preferred embodiments are intended in an illustrative and not in a limiting sense. The true spirit and scope of the invention are set forth in the following claims.

What is claimed is:
1. A tool for slitting and spreading an insulating jacket surrounding an electrical conductor in an elongate electrical cable, comprising:
   support means for supporting a longitudinal extent of said cable in a fixed plane thereon;
   movable cutting means adjacent said support means for piercing at a point the insulating jacket of an electrical cable disposed on said support means upon movement of said cutting means toward such cable and for progressively slicing upon continued movement said insulating jacket longitudinally unidirectionally from said point; and
   means for progressively longitudinally unidirectionally entering said sliced insulating jacket and laterally spreading portions thereof.

2. A tool according to claim 1, wherein said entering and spreading means is disposed on said movable cutting means to enter said sliced insulating jacket subsequent to said slicing whereby upon such continued movement of said movable cutting means the spreading of said insulating jacket portions lags the slicing.

3. A tool according to claim 1, wherein said movable cutting means comprises a rotary cutting member mounted for rotation about an axis transverse the longitudinal direction of said cable.

4. A tool according to claim 3, wherein said spreading means comprises curved wedging means on said rotary cutting member arcuately disposed about said axis.

5. A tool for slitting and spreading an elongate cable comprising:
   a housing;
   support means on said housing defining a longitudinal direction and a fixed plane for supporting a longitudinal extent of said cable thereon; and
   a rotary cutting member mounted on said housing for rotation about an axis transverse said longitudinal direction, said cutting member having a piercing point thereon and a slicing edge extending outwardly therealong to said piercing point, said slicing edge being substantially orthogonal to said axis and defining a plane extending in said longitudinal direction during rotation of said cutting member,
   a curved wedge on said cutting member lying in an arcuate direction about said axis, said curved wedge having an inclined surface therealong extending gradually away from the plane defined by said slicing edge in the direction of said axis of rotation, said piercing point, slicing edge and curved wedge being disposed to intersect said fixed plane during rotation of said cutting member.

6. A tool according to claim 5, wherein said rotary cutting member is of segmented generally circular configuration.

7. A tool according to claim 6, wherein said curved wedge has an outer peripheral portion defining a wedge circumference and wherein said piercing point lies in a piercing circumference greater than said wedging circumference.

8. A tool according to claim 6, wherein said slicing edge extends radially along said cutting member.

9. A tool according to claim 8, wherein said inclined surface begins at a point angularly spaced from said slicing edge.

10. A tool according to claim 6, wherein said rotary member is of generally semi-circular configuration.

11. A tool according to claim 10, wherein said slicing edge defines a leading edge upon rotation of said rotary cutting member and wherein the curved wedge terminates adjacent an edge defining a trailing edge, said leading and trailing edges disposed to each sequentially enter, pass through and exit said fixed plane during one complete revolution of said rotary cutting member.

12. A cutter for use in a tool for slitting and spreading a sheathed multiconductor cable comprising a rotary cutting member having an axis about which said member is rotatable, a piercing point on said member and a slicing edge extending outwardly of said axis to said piercing point, said slicing edge lying in a plane substantially orthogonal to said axis, and an inclined cam surface lying arcuately on said member and about said axis, said inclined cam surface having a gradual rise therealong relative to said plane.

13. A tool for slitting and spreading the insulating sheath of an elongate sheathed three-conductor cable having two outer conductors and a central conductor, comprising:
  a housing;
  cable support means on said housing for supporting a longitudinal extent of said cable in a fixed plane in a longitudinal direction;
  a pair of spaced rotary cutting members mounted on said housing for rotation about an axis transverse said longitudinal direction, each cutting member including a piercing point for piercing the sheath of a cable positioned on said cable support means on opposite sides of said central conductor upon rotation of said cutting members,
  each of said cutting members having a slicing edge extending radially therealong to said piercing point, each slicing edge lying in substantially parallel longitudinally extending planes for progressively slicing said sheath longitudinally upon continued rotation of said cutting members, and
  a curved wedge on each of said cutting members extending arcuately about said axis, each curved wedge having an inclined surface gradually extending outwardly away from the respective planes of said slicing edges for progressively longitudinally entering said sliced sheath, spreading the outer conductors laterally away from said central conductor and exiting said sliced sheath during continuous rotation of said cutting members.

14. A tool according to claim 13, wherein said cable support means comprises means for transversely aligning said cable relative to said cutting members such that said central conductor lies in a longitudinal plane extending between said pair of spaced rotary cutting members.

15. A tool according to claim 13, further including means for tandemly rotating said rotary cutting members.

16. A tool according to claim 13, further comprising anvil means separating said rotary cutting members and cooperating with said slicing edges to provide a scissor action therebetween during rotation of said rotary cutting members.

17. A tool according to claim 16, further including means biasing said rotary cutting members in the axial direction against said anvil means.

18. A tool according to claim 16, wherein said anvil means comprises a plate having at least one substantially flat edge lying adjacent said supporting means for supporting the central conductor of said cable positioned on said supporting means.

19. In a tool for slitting and spreading conductors in a sheathed multiconductor cable of the type having means for supporting a longitudinal extent of said cable in a fixed longitudinal direction, apparatus comprising:
  rotary cutting means mounted adjacent said supporting means for rotation in said tool about an axis transverse said longitudinal direction including:
    a. piercing means for piercing at a first point the sheath of a cable positioned on said supporting means upon rotation of said rotary cutting means;
    b. slicing means for progressively slicing upon continued rotation of said cutting means said sheath longitudinally unidirectionally from said first point to a second point; and
    c. curved wedging means for entering said cable between said first and second point at a third point and for laterally spreading sliced portions of said sheath from said third point progressively longitudinally unidirectionally to a fourth point upon rotation of said cutting means, the distance between said third and fourth points being less than the distance between said first and second points.

20. Apparatus according to claim 19, wherein said rotary cutting means comprises a member of segmented generally circular configuration wherein said curved wedging means has an outer portion defining a wedging circumference and wherein said piercing means is defined by a piercing point lying in a piercing circumference greater than said wedging diameter.

* * * * *